(12) United States Patent
Lundberg

(10) Patent No.: US 9,889,565 B2
(45) Date of Patent: Feb. 13, 2018

(54) METHOD FOR CALIBRATING A ROBOT AND A ROBOT SYSTEM

(71) Applicant: ABB Schweiz AG, Baden (CH)

(72) Inventor: Ivan Lundberg, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/320,591

(22) PCT Filed: Jun. 23, 2014

(86) PCT No.: PCT/EP2014/063131
§ 371 (c)(1),
(2) Date: Dec. 20, 2016

(87) PCT Pub. No.: WO2015/197100
PCT Pub. Date: Dec. 30, 2015

(65) Prior Publication Data
US 2017/0157770 A1 Jun. 8, 2017

(51) Int. Cl.
*B25J 9/16* (2006.01)
*G05B 19/401* (2006.01)

(52) U.S. Cl.
CPC ........... *B25J 9/1692* (2013.01); *B25J 9/1697* (2013.01); *G05B 19/401* (2013.01); *G05B 2219/39024* (2013.01)

(58) Field of Classification Search
CPC .................. B25J 9/1692; B25J 9/1697; G05B 2219/39024; G05B 19/401;
(Continued)

(56) References Cited

U.S. PATENT DOCUMENTS 6,300,974 B1  10/2001  Viala et al.
6,484,049 B1 *  11/2002  Seeley .................... A61B 5/06
                                                    600/426

(Continued)

FOREIGN PATENT DOCUMENTS

EP      2402124 A2    1/2012
JP      10340112 A    12/1998

OTHER PUBLICATIONS

International Search Report & Written Opinion of the International Searching Authority Application No. PCT/EP2014/063131, Completed: Apr. 8, 2015 dated Apr. 15, 2015 11 Pages.

*Primary Examiner* — Dalena Tran
(74) *Attorney, Agent, or Firm* — Whitmyer IP Group LLC

(57) ABSTRACT

A system for calibrating a robot having a movable part with a calibration marker including: positioning the calibration marker along an optical line of a camera unit; imaging the calibration marker along the optical line to establish line positions $P_1 \ldots P_N$ within a tolerance k, while monitoring joint values $j_1 \ldots j_M$ of the robot; establishing an error function based on resulting calculated robot positions $P'_1 \ldots P'_N$, for the calibration marker for joint values $j_1 \ldots j_M$ at each line position $P_1 \ldots P_N$ for the calibration marker; identifying a set of robot kinematic parameters by solving an optimization problem based on the error function; and updating a kinematic model of the robot via the identified set of robot kinematic parameters.

15 Claims, 3 Drawing Sheets

(58) Field of Classification Search
CPC . A61B 2034/2055; A61B 6/583; A61B 90/36; A61B 5/064
USPC .................................. 700/254; 600/426, 424
See application file for complete search history.

(56) References Cited

U.S. PATENT DOCUMENTS

| | | | |
|---|---|---|---|
| 8,977,346 B2* | 3/2015 | Chung-Ming | ......... A61B 5/706 600/473 |
| 9,078,685 B2* | 7/2015 | Smith | ...................... A61B 5/06 |
| 2005/0273202 A1 | 12/2005 | Bischoff | |
| 2008/0004750 A1 | 1/2008 | Ban et al. | |
| 2011/0320039 A1 | 12/2011 | Hsu et al. | |
| 2013/0274921 A1 | 10/2013 | Aiso | |
| 2014/0018957 A1 | 1/2014 | Matsumoto | |

* cited by examiner

METHOD FOR CALIBRATING A ROBOT AND A ROBOT SYSTEM

TECHNICAL FIELD

The present invention relates to techniques for calibrating a robot, and in particular a method for calibrating a robot and a robot system. The invention also relates to a robot controller, a robot unit, use of the robot unit, a program for calibrating a robot and a computer readable medium.

BACKGROUND

For calculating a position for a robot end effector based on robot joint values, a kinematic model of the robot can be used. For high accuracy positioning of the robot, the kinematic parameters of the robot must be precisely identified. The procedure of performing some motion with the robot, measuring an outcome and fitting a calculated outcome to the measured outcome by adjusting the kinematic parameters is known as robot calibration.

Most commonly an external measurement system is used for calibration. Typically this measurement system is a high precision three dimensional device such as a laser tracker. So called self-calibration methods using constraints have also been proposed. Three dimensional systems are however associated with high costs, and self-calibration systems have limited accuracy as uncertainties from friction will come into play.

One method that has been proposed for robot calibration is to use a laser pointer and a position sensitive device (PSD). However, a problem with laser pointers and PSDs is that they are normally not used in production. Installing them for the sole purpose of calibration would add cost and complexity to the system. For field calibration, i.e. calibration on site after the robot has been installed, a more simple method is needed. Ideally the calibration should be performed without additional sensors or devices, since any external equipment will be associated with cost and complexity.

In the case of a vision guided robot, the camera is part of the system. It would thus be desirable to use the camera to calibrate the robot, in case the robot accuracy needs to be improved for the vision guided hand.

Robot camera calibration has been proposed in literature and tested. By formulating an error function that includes the robot kinematic parameters and the intrinsic and extrinsic camera parameters, the robot and camera parameters can be retrieved by simultaneously optimizing the robot kinematic parameters and camera parameters.

For example, US2013/0274921A1 describes a robot system including a digital camera, where a movable part of the robot has got a mark attached thereto. The digital camera outputs image data by imaging a range of movements of the mark, and a calibrator creates a transformation parameter for correlating a two dimensional coordinate system of the image data with a three-dimensional coordinate system of the movable part.

A drawback with this simultaneous optimization of robot and camera parameters is that a plurality of additional camera parameters must be identified at the same time as the robot parameters. This will make the optimization problem harder to solve and limit the final accuracy of the parameters.

There is thus a need for a simpler and less complex method for identifying the robot parameters.

SUMMARY

According to a first aspect, the object is at least partly achieved by a method for calibrating a robot, wherein the robot comprises a movable part with a calibration marker. The method comprises:
- positioning the calibration marker in a plurality of positions along an optical line of a camera unit;
- imaging the calibration marker at the plurality of positions along the optical line to establish line positions $P_1 \ldots P_N$ of the calibration marker along the optical line within a tolerance k, while monitoring joint values $j_1 \ldots j_M$ of the robot;
- establishing an error function based on resulting calculated robot positions $P'_1 \ldots P'_N$ for the calibration marker for joint values $j_1 \ldots j_M$ at each line position $P_1 \ldots P_N$ for the calibration marker;
- identifying a set of robot kinematic parameters by solving an optimization problem based on the error function; and
- updating a kinematic model of the robot by means of the identified set of robot kinematic parameters.

With the method it is possible to separate the identification of the robot parameters from the camera parameters. The camera unit is only used to ascertain that the calibration marker really is positioned along the same optical line, and for that the parameters of the camera do not have to be accurately determined. Kinematic parameters of the robot are identified with high accuracy, since camera errors are eliminated by the proposed method. The optimization problem becomes easier to solve and the accuracy of the final parameters is increased compared to when solving an optimization problem with more unknown parameters, e.g. the camera parameters. The method is easy to implement, which makes it a cheap solution for calibrating the robot. No additional hardware is needed, except the often already existing robot camera.

Further, other parameters than kinematic parameters of the robot may be determined and thus calibrated. For example, the coordinates of the tool centre point of the calibration marker may be established.

According to one embodiment, the method comprises positioning the calibration marker with a unique orientation of the robot in at least some of the line positions $P_1 \ldots P_N$ of the calibration marker.

According to one embodiment, the method comprises performing an iterative process to cause the robot to position the calibration marker along the optical line within the tolerance to establish a line position $P_k$ of the calibration marker. It can then be assured that the calibration marker is positioned sufficiently close to the optical line.

According to one embodiment, the method comprises calculating an error between a position of the calibration marker in an image plane of a camera unit imaging the calibration marker and a position of the optical line in the image plane of the camera unit, compare the error with the tolerance and adjusting the position of the calibration marker based on the result of the comparison in order to establish a line position $P_k$ of the calibration marker. Thus, by using the camera unit the error in position of the robot unit may be established.

According to one embodiment, the error function is calculating a line fitting the resulting calculated robot positions $P'_1 \ldots P'_N$ for the calibration marker. By establishing a best fit line of the positions the most optimal kinematic parameters may be determined. The error function may be based on minimizing the distance of the resulting calculated robot positions $P'_1 \ldots P'_N$ for the calibration marker to the line.

According to one embodiment, the optimization problem includes minimizing an error of the error function. The most optimal kinematic parameters of the robot may be determined by finding the parameters that gives a solution with the smallest error.

According to one embodiment, the number N of positions for the calibration marker is at least six, to be able to retrieve accurate kinematic parameters of the robot and to solve the optimization problem.

According to a second aspect, the object is at least partly achieved by a robot controller configured to execute the method.

According to a third aspect, the object is at least partly achieved by a robot unit comprising a camera unit, wherein the robot unit is configured to execute the method.

According to a fourth aspect, the object is at least partly achieved by using a robot unit.

According to a fifth aspect, the object is at least partly achieved with a computer program, P, in connection with a robot system, where the computer program P comprises computer instructions configured to cause a computer unit to perform the method.

According to a sixth aspect, the object is at least partly achieved with a computer readable medium storing computer program code for performing the method, when running on a processor associated with a computer unit.

According to a seventh aspect, the object is at least partly achieved with a robot system. The robot system comprises a robot with a movable part with a calibration marker and a robot controller with a kinematic model of the robot, wherein the robot controller is arranged to control the movable part in a three-dimensional space based on control input. The robot system further comprises a camera unit that is arranged to capture images of the calibration marker on the movable part. The robot system is arranged to:
 position the calibration marker in a plurality of positions along an optical line of the camera unit;
 image the calibration marker at the plurality of positions along the optical line to establish line positions $P_1 \ldots P_N$ of the calibration marker along the optical line within a tolerance, while monitoring joint values $j_1 \ldots j_M$ of the robot;
 establish an error function based on resulting calculated robot positions $P'_1 \ldots P'_N$ for the calibration marker for joint values $j_1 \ldots j_M$ at each line position $P_1 \ldots P_N$ for the calibration marker;
 identify a set of robot kinematic parameters by solving an optimization problem based on the error function; and
 update the kinematic model of the robot by means of the identified set of robot kinematic parameters.

Preferred embodiments are set forth in the dependent claims and in the detailed description.

DESCRIPTION OF THE DRAWINGS

Below the invention will be described in detail with reference to the appended figures, of which.

DETAILED DESCRIPTION

Figure 1:
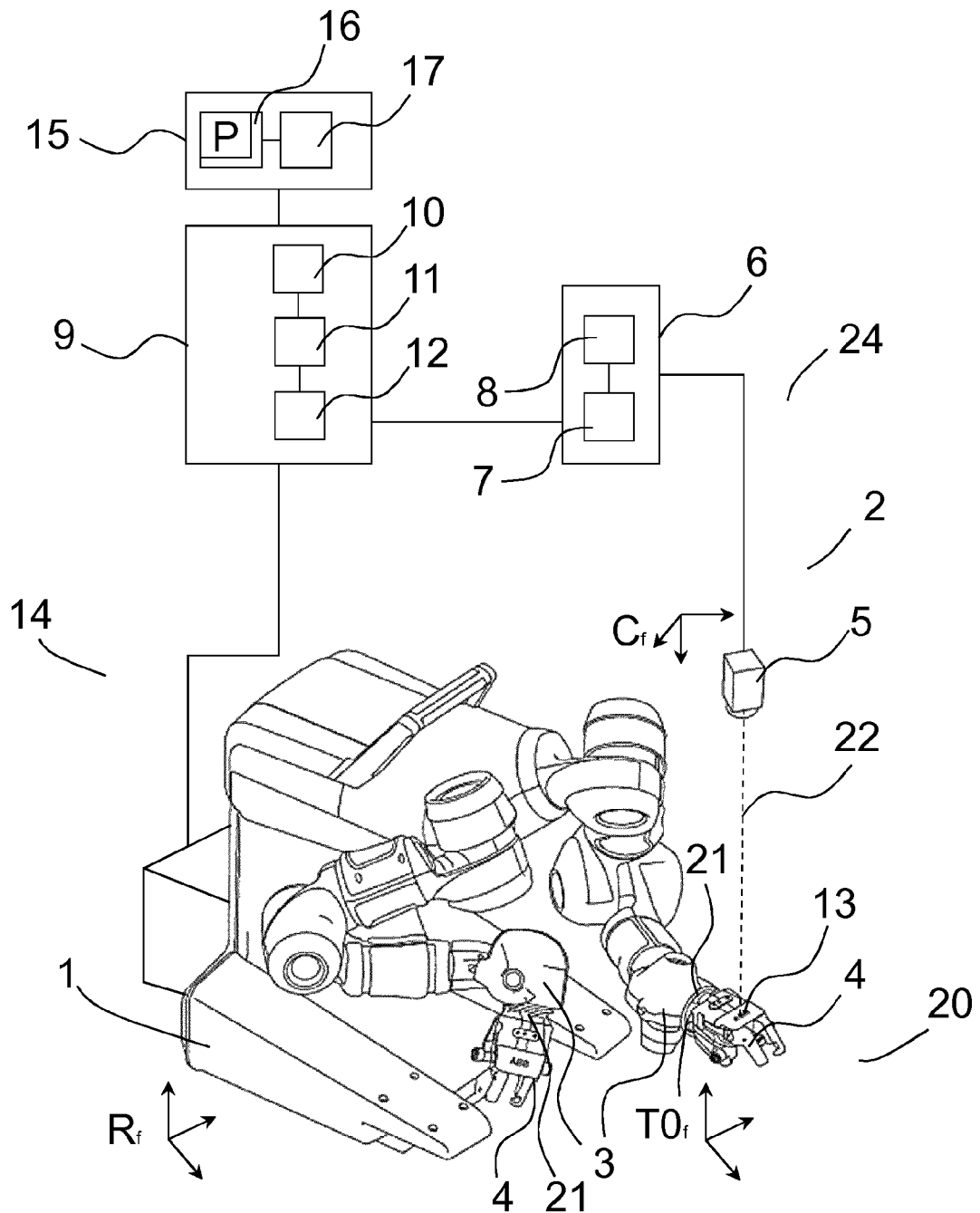
FIG. 1 shows a dual-arm robot arranged with a camera unit.

FIG. 1 illustrates an example of a robot system 14. The robot system 14 comprises a robot 1 defining a robot coordinate system $R_f$ and an object identification unit 2 defining a camera coordinate system $C_f$. The robot 1 is a redundant robot and has seven degrees of freedom. The robot 1 shown in FIG. 1 is a dual-arm robot with two robot arms 3, but the invention may be used with all kinds of robots. In particular it is also applicable for articulated arm robots with six degrees of freedom.

Each robot arm 3 in FIG. 1 has a plurality of links connected in series. Movement of each of these links may be a translational movement or a rotation around an axis, or a combination. Both of these movement variations give each link a mechanical degree of freedom around or along what in the following will be referred to as a joint. A joint may be actuated by a servo-controlled electrical motor, which is controlled via feedback from the measured motion of the motor. In the following it is referred to a joint value $j_m$ meaning a joint angle of a joint m of the robot 1. A robot with seven degrees of freedom normally has seven joints; a robot with six degrees of freedom normally has six joints. Each robot arm 3 is also provided with a tool flange 21 defining a tool flange coordinate system $T0_f$. An end effector 4 is attached to each tool flange 21. The relationship between the robot and tool flange coordinate systems $R_f$ and $T0_f$ is a known relationship. A robot arm 3 or end effector 4 may be seen as a movable part of the robot 1. A calibration marker 13 is here attached to each of the end effectors 4, but may instead be attached to another movable part of the robot, i.e. any other link of the robot 1.

The robot 1 and the object identification unit 2 are located at a work station 20. The robot 1 is configured to perform work at the work station 20. The robot 1 and the object identification unit 2 may be referred to as a robot unit 24.

The robot 1 comprises a robot controller 9 configured to control movement of one or both of the robot arms 3 in a three-dimensional space by means of controlling a plurality of electric motors on the robot arms 3 based on control input. The robot controller 9 comprises a programming unit 10, e.g. a computer programming unit (CPU), a computer readable storage medium 11 and a drive unit 12. The robot controller 9 comprises a kinematic model of the robot 1, e.g. stored in the computer readable storage medium 11. The kinematic model includes a model of the joints and the links of the robot 1 and their geometric relations. The programming unit 10 is configured to execute a robot program located on the computer readable storage medium 11, wherein one or both of the robot arms 3 are moved to a plurality of positions. The drive unit 12 is configured to control the electric motors of the robot arm or arms 3 in dependency of the executed robot program. The robot 1 is further configured to measure the pose of the tool flange coordinate system $T0_f$ using angular measurement of the joints of the robot 1 and a direct kinematic model of the robot 1.

The object identification unit 2 comprises a camera unit 5 and an information processing unit 6. The camera unit 5 is configured to be directed to the work station 20 of the robot 1. The information processing unit 6 comprises a programming unit 7, e.g. a CPU, and a computer readable storage medium 8. The information processing unit 6 is configured to receive information from the camera unit 5 in the form of an image of one or more objects at the work station 20. The camera unit 5 is configured to measure u and v values of the object in image coordinates in an image coordinate system $IP_f$ of the image plane 19 (FIG. 2) of the camera unit 5. The image coordinates can be either raw pixel data or data transformed to a reference frame, for instance by means of a checkerboard, as the calibration method that will be described works well for both kinds of data. The information processing unit 6 is configured to process the image information so that the object is recognized and a position of the object is determined in the camera coordinate system $C_f$ by means of object recognition algorithms. In particular, the camera unit 5 is arranged to capture images of the calibration marker 13 on a movable part of the robot 1, the end effector 4. With other words, the object identification unit 2 is configured to measure u and v values of the calibration marker 13 on the end effector 4. The exact location $T_f$ of the calibration marker 13 on the end effector 4 in relation to the tool flange 21 does not need to be known in advance. Consequently, the calibration marker 13 does not need to be permanently attached on the end effector 4 but it can be attached temporarily for the purpose of calibration, and it can take the form of a removable sticker, a magnet, or the like. In the FIG. 1, the calibration marker 13 has the form of an "ABB"-sticker. The calibration marker 13 may however have another appearance. For the purpose of performing the method a certain point of the calibration marker 13 is used.

Based on the position of the recognized object, the robot 1 is configured to move any or both of the robot arms 3 to the position of the object and perform work on the object, such as picking, welding, painting, assembling, etc. Accordingly, the robot 1 and the object identification unit 2 are co-operating in the work at the work station 20.

In order to enable co-operation between camera and robot, the relationship between the robot coordinate system $R_f$ of the robot 1 and the camera coordinate system $C_f$ of the object identification unit 2 has to be known. Therefore, the coordinate systems must be calibrated with each other prior to performing work at the work station 20. It shall be understood that calibration may comprise correcting one of the robot and the camera coordinate systems $R_f$, $C_f$ with the other of the robot and camera coordinate system $R_f$, $C_f$.

The robot system 14 further comprises a computer unit 15 with a programming unit 17, e.g. a CPU, and a computer readable storage medium 16. The computer readable storage medium 16 may store a computer program P, where the computer program P comprises computer instructions configured to cause the computer unit 15 to perform the calibration method according to any of the steps of the method. The computer instructions can thus be executed by the computer unit 15, whereby the method will be performed.

The computer unit 15 is e.g. configured to generate a plurality of poses to which the end effector 4 is to be moved by the robot arm 3. A pose thus includes both an orientation and a position of the end effector 4. The computer unit 15 is further configured to move the calibration marker 13 to a plurality of positions along a same optical line of the camera unit 5. The computer unit 15 is also configured to coordinate the information processing unit 6 and the robot 1, such that e.g. poses of the robot 1 and measurements made with the information processing unit 6 can be related to each other. Further, the computer unit 15 is configured to make the calculations etc. which will be described in the following.

The computer readable storage mediums 8, 11, 16 are here illustrated as independent storage areas, but might all be implemented as one computer readable storage medium. A computer readable storage medium is a non-transitory computer readable storage medium, e.g. a flash memory, a RAM (Random Access Memory) or similar. Further, the programming units 7, 10, 17 may be implemented as one or several programming units.

A method will now be described how the robot 1 may be calibrated without the need for simultaneous calibration of the camera unit 5. Thereafter, when the robot 1 has been calibrated, the camera unit 5 may be calibrated in an easier way than before to enable cooperation between the robot 1 and the camera unit 5. To explain the method, reference will be made to the FIGS. 2, 3 and 4.

The method includes a data collecting part, where a movable part of the robot 1 with a calibration marker 13 attached thereon is positioned in a plurality of positions. The aim with the measurement part is to retrieve data from the robot 1 that can be used for an optimization. After enough data from the robot 1 has been retrieved, a calculation part follows where calibrated robot parameters such as kinematic parameters of the robot 1 are calculated.

Before the data collecting part and the calculation part of the method are carried out, a rough camera calibration may be performed to make the camera unit 5 better prepared for iterative searching of an optical line 22 of the camera unit 5. It is made sure that the object identification unit 2 may locate the calibration marker 13 in an image taken by the camera unit 5 and extract the u, v position of the marker 13. The u, v position of the marker 13 is for example a corner of the marker 13. It may also be ensured that a focus and a shutter of the camera unit 5 are set to appropriate values so that the marker 13 can be found in the image for a region used in the calibration.

Figure 4:
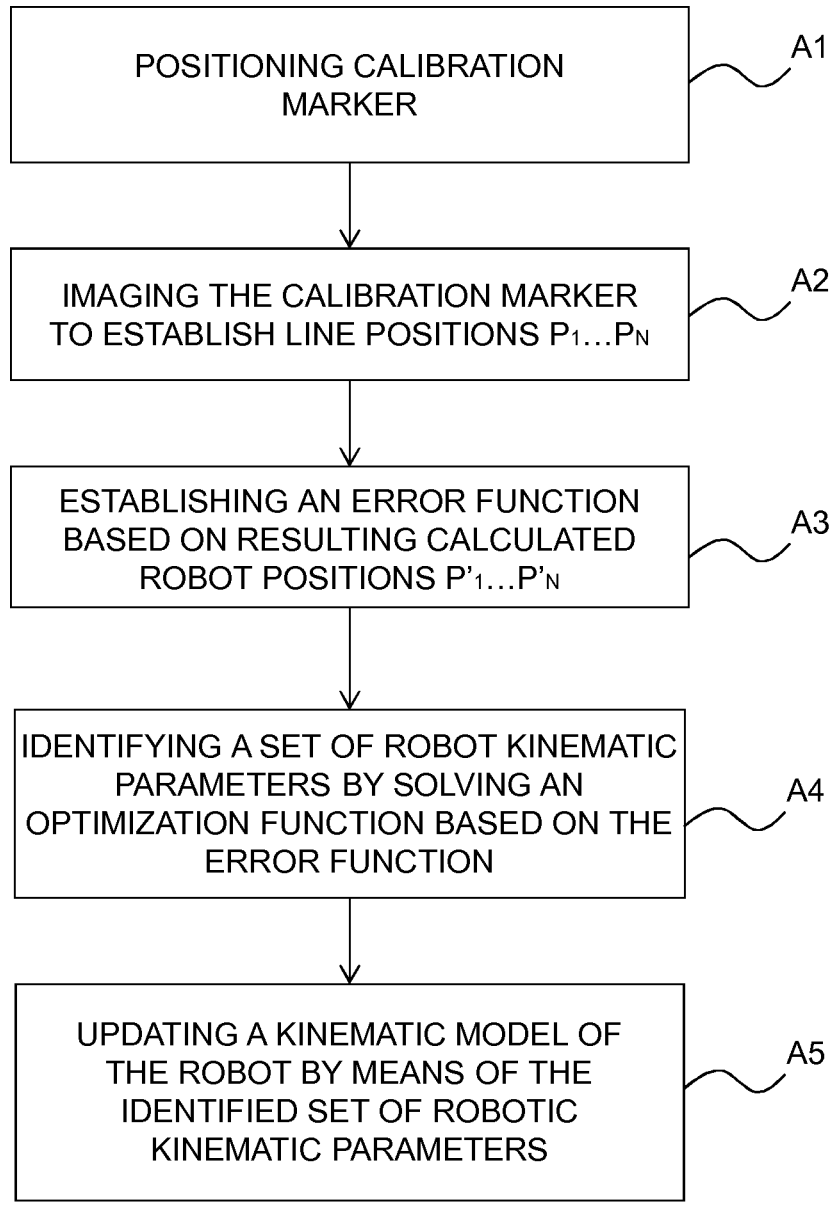
FIG. 4 shows a flowchart with the method according to one embodiment.

The data collecting part and the calculation part will now be described in connection with the flowchart in FIG. 4.

Data Collecting Part

In the data collecting part, the robot system 14 positions the calibration marker 13 in a plurality of positions along an optical line 22 of the camera unit 5 (A1). The robot system 14 knows the extension of the optical line 22, which can be any optical line 22 of the camera unit 5. This optical line 22 may be determined starting from any first positioning of the calibration marker 13 in the field of view of the camera unit 5. The optical line 22 is thus a straight line extending from the camera unit 5 in the field of view from the camera unit 5. If something is positioned along the same optical line 22, it will give the same pixel reading on an image plane 19 of the camera unit 5. If the robot 1 was not influenced by wear etc, the robot system 14 would always position the calibration marker 13 at the optical line 22 if instructed to do so. But, as the physical links and joints of the robot 1 do not always correspond to the un-calibrated kinematic model of the robot 1, the calibration marker 13 will be physically offset from the optical line 22. Therefore, the calibration marker 13 is imaged by the camera unit 5 at the plurality of positions along the optical line 22 to finally establish line positions $P_1 \ldots P_N$ of the calibration marker 13 along the optical line 22 within a tolerance. The tolerance may be set by the operator, or automatically by the robot system 14. The tolerance is one parameter that determines the final accuracy of the calibration. During the positioning, the joint values $j_1 \ldots j_M$ of the robot 1 are monitored (A2). "M" is the number of joints of the robot 1, or at least the number of joints of the robot 1 of interest for the calibration.

Figure 2:
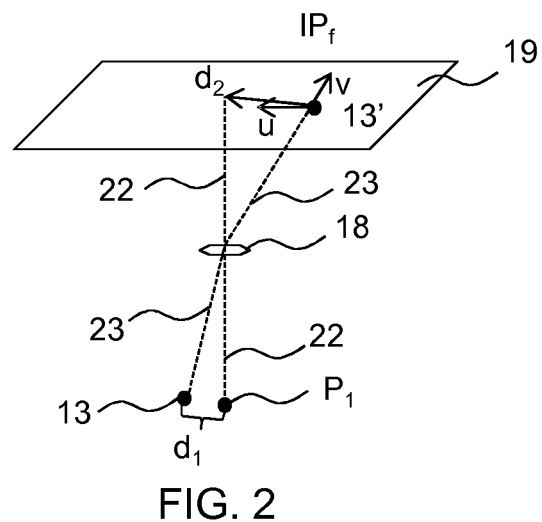
FIG. 2 illustrates how line positions $P_k$ are established.

To further explain this, reference is made to FIG. 2. In FIG. 2, the image plane 19 of the camera unit 5 is illustrated. Every optical line 22 of the camera unit 5 has a unique measurement value along the axes u and v in the coordinate system $IP_f$ of the image plane 19. The measurement value is typically a pixel value. Each positioning along a same optical line 22 of the camera unit 5 may then be recognized with a unique pixel value. The point 13 denotes the position of the calibration marker 13. The robot system 14 has, when instructed to do so, tried to position the calibration marker 13 along the optical line 22 according to the robot coordinate system $R_f$. As the robot 1 here is not calibrated, the calibration marker 13 is however placed at a distance $d_1$ from the optical line 22, and thus along a different optical line 23. The calibration marker 13 is imaged in the image plane 19 via a lens 18 in the camera unit 5 and is in the example located a distance $d_2$ from the optical line 22 in the image plane 19 of the camera unit 5. $d_2$ is also referred to as a correction vector.

An iterative process may now be performed to cause the robot 1 to position the calibration marker 13 along the optical line 22. For each new position of the calibration marker 13 a correction vector $d_2$ may be calculated to correctly position the calibration marker 13 on the optical line 22. The correction vector $d_2$ has a two dimensional extension along the axes u and v in the image plane 19. The correction vector $d_2$ is fed back to the robot controller 9 which re-positions the calibration marker 13 in order to minimize the error. The correction vector $d_2$ is for this converted to a correction vector in the robot coordinate system $R_f$. The robot 1 is thus corrected in accordance with the correction vector $d_2$ and this procedure is iterated until the calibration marker 13 is sufficiently close to the optical line 22. The camera unit 5 may thus take a plurality of images of each unique positioning of the calibration marker 13. "Sufficiently close" here means within a tolerance. When the calibration marker 13 is positioned along the optical line 22 within a tolerance, the position of the calibration is called a "line position $P_k$" of the calibration marker 13.

For example, the correction vector may be calculated as an error between the position of the calibration marker 13' in the image plane 19 of the camera unit 5 and a position of the optical line 22 in the image plane 19 of the camera unit 5. The error can be compared with the tolerance, and the position of the calibration marker 13 may be adjusted based on the result of the comparison in order to establish a line position $P_k$ of the calibration marker 13. If the calibration marker 13' after the adjustment is within the tolerance, a line position $P_k$ (in the FIG. 2: $P_1$) is established. If the calibration marker 13' after the adjustment is not within the tolerance, a new correction vector or error is calculated, and the robot 1 re-positions the calibration marker 13 accordingly to reduce or remove the error.

The robot 1 positions the calibration marker 13 in a plurality of line positions $P_1 \ldots P_N$ that are sufficiently close to the optical line 22. For at least some of the line positions $P_1 \ldots P_N$, the robot 1 has a unique orientation. At least some of the line positions $P_1 \ldots P_N$ are separated apart along the optical line 22. The robot configuration, e.g. signs of wrist, elbow or shoulder singularity, may also be varied in each or at least some of the line positions $P_1 \ldots P_N$. A robot 1 may reach the same position in a plurality of different configurations. For an articulated robot with six axes, the same position may be reached in typically eight different ways. By moving the robot to the same position using different configurations and using joint values from these different configurations in the calculations, a better calibration of the robot 1 may be achieved. For a redundant robot, e.g. a dual-arm robot, it may also be beneficial to vary the arm angle. The number N of line positions for the calibration marker 13 is according to one embodiment at least six.

When the calibration marker 13 is in a line position $P_k$ that according to the camera unit 5 is on the intended optical line 22 within a tolerance, a position reading from the robot 1 gives the impression that the calibration marker 13 is in another position $P'_k$ as the robot 1 is not yet calibrated. These incorrect positions indications of the calibration marker 13 are referred to as resulting calculated robot positions $P'_k$. The resulting calculated robot positions $P'_k$ may be expressed in the robot coordinate system $R_f$ of the robot 1.

When a line position $P_k$ has been established, the corresponding joint value or values $j_m$ of the robot 1 are read and recorded. Based on joint values $j_m$ and the kinematic model of the robot 1, the resulting robot positions $P'_k$ may be calculated. The output from the data collection part is a set of N line positions $P_k$, their corresponding joint values $j_m$, and the resulting calculated robot positions $P'_k$. For each line position $P_k$, joint values $j_m$ for each joint of the robot 1 are retrieved. Thus, if the number of joints is six, a joint value for each joint, thus six values, may be recorded for each line position $P_k$. These parameters can be saved e.g. in the computer readable storage medium 16 of the computer unit 15. The programming unit 17 is configured to make the calculations herein described.

When it is referred to moving the robot 1 to a certain point, position, orientation or pose, it here means to move the tool flange 21 to a certain point, position, orientation or pose.

Calculation Part

Figure 3:
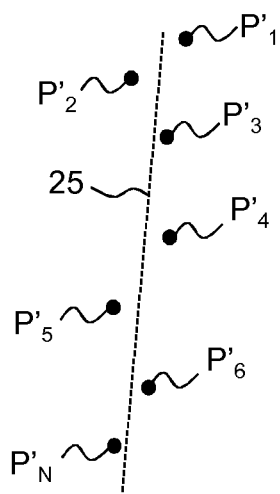
FIG. 3 illustrates a line fit to a plurality of resulting calculated positions $P'_k$

Once a sufficient set of measurements along the optical line 22 has been produced, an error function e for the robot 1 is established (A3). The error function calculates a principal line 25 based on the resulting calculated robot positions $P'_k$ and a distance for each individual position $P'_k$ to the principal line 25. In FIG. 3, an example of a principle line 25 that is fitting the resulting calculated robot positions $P'_1 \ldots P'_N$ for the calibration marker 13 is shown. Below it is explained how the principal line 25 fitting the resulting calculated robot positions $P'_1, \ldots P'_N$ may be calculated, and how an error function e may be established.

A line in three dimensional space can be described as follows:

$$P_0 + tv \qquad (1)$$

where $P_0 = [x_0, y_0, z_0]$ is a point on the line, $v = [\alpha, \beta, \gamma]$ is the direction vector of the line and t is a scalar number. For any point $P_n = [x_n, y_n, z_n]$, a distance d to the line described by equation (1) may be calculated as:

$$d = \frac{|v \times P_0 P_n|}{|V|} \qquad (2)$$

where $$P_0 P_n = P_n - P_0.$$

For a set of resulting calculated robot positions or points $P'_1 \ldots P'_N$ known to lie along a line given by $P_0$ and v we can thus calculate an error function $e = e_1, e_2, \ldots, e_n$ where $$e_k = \frac{|v \times P_0 P_k|}{|V|} \qquad (3)$$

The distance $d_k$ for each resulting calculated robot position $P'_k$ to the principal line 25 may thus be seen as an error $e_k$. As an alternative, averages of groups of errors may be established.

To identify robot kinematic parameters that are calibrated, an optimization problem is solved based on the error function (A4). The total error of the error function e shall be minimized to find an optimal principal line 25 that fits the resulting calculated robot positions P'$_k$. To do this, an error function is formed as follows:

$$f(j,\varphi)=e \quad (4)$$

where f is a direct kinematic model, j are the joint values for each resulting calculated robot position P'$_k$ and φ represent the unknown kinematic parameters of the robot 1. The unknown kinematic parameters may be represented by the Denavit-Hartenberg parameters, which are known to the skilled person in the art. φ may also include the unknown tool center point T$_{tcp}$ and φ may then be referred to as internal parameters of the robot 1. According to one embodiment, N number of equations f is established.

The error may be minimized using non-linear least squares optimization. For instance a Gauss Newton method is used to minimize the error function (4), which may be done by calculating a Jacobian:

$$J_{ij} = \frac{\partial e_i}{\partial \varphi_j} \quad (5)$$

The optimization may then be done by updating an initial guess of the kinematic parameters, φ$_0$ according to:

$$\varphi_{n+1}=\varphi_n-(J^TJ)^{-1}Jf(j,\varphi) \quad (6)$$

The iteration is repeated until convergence is achieved.

The result of the optimization is a set of robot kinematic parameters φ$_{k,k=1 \ldots n}$. The kinematic model of the robot 1 is then updated by means of the robot kinematic parameters φ$_{k,k=1 \ldots n}$ (A5). The method may e.g. be used to calibrate joint offsets of a robot 1.

The method may be executed automatically by the robot 1, for example initiated by an operator via a robot user interface.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for calibrating a robot, wherein the robot includes a movable part with a calibration marker, the method comprising:
   positioning the calibration marker, with a robot controller, in a plurality of positions along an optical line of a camera unit;
   imaging the calibration marker, with the camera unit, at the plurality of positions along the optical line to establish line positions P$_1$ . . . P$_N$ of the calibration marker along the optical line within a tolerance k, while monitoring joint values j$_1$ . . . j$_M$ of the robot;
   establishing an error function based on resulting calculated robot positions P'$_1$ . . . P'$_N$ for the calibration marker for joint values j$_1$ . . . j$_M$ at each line position P$_1$ . . . P$_N$ for the calibration marker;
   identifying a set of robot kinematic parameters by solving an optimization problem based on the error function; and
   updating a kinematic model of the robot using the identified set of robot kinematic parameters.

2. The method according to claim 1, comprising positioning the calibration marker with a unique orientation of the robot in at least some of the line positions P$_1$ . . . P$_N$ of the calibration marker.

3. The method according to claim 2, comprising performing an iterative process to cause the robot to position the calibration marker along the optical line within the tolerance to establish a line position P$_k$ of the calibration marker.

4. The method according to claim 2, comprising calculating an error between a position of the calibration marker in an image plane of a camera unit imaging the calibration marker and a position of the optical line in the image plane of the camera unit, compare the error with the tolerance and adjusting the position of the calibration marker based on the result of the comparison in order to establish a line position P$_k$ of the calibration marker.

5. The method according to claim 2, wherein the error function is calculating a line fitting the resulting calculated robot positions P . . . P, for the calibration marker.

6. The method according to claim 2, wherein solving the optimization problem includes minimizing an error of the error function.

7. The method according to claim 2, wherein the number N of positions for the calibration marker is at least six.

8. The method according to claim 1, comprising performing an iterative process to cause the robot to position the calibration marker along the optical line within the tolerance to establish a line position P$_k$ of the calibration marker.

9. The method according to claim 1, comprising calculating an error between a position of the calibration marker in an image plane of a camera unit imaging the calibration marker and a position of the optical line in the image plane of the camera unit, compare the error with the tolerance and adjusting the position of the calibration marker based on the result of the comparison in order to establish a line position P$_k$ of the calibration marker.

10. The method according to claim 1, wherein the error function is calculating a line fitting the resulting calculated robot positions P'$_1$ . . . P'$_N$ for the calibration marker.

11. The method according to claim 10, wherein the error function is based on minimizing the distance of the resulting calculated robot positions P'$_1$ . . . P'$_N$ for the calibration marker to the line.

12. The method according to claim 1, wherein solving the optimization problem includes minimizing an error of the error function.

13. The method according to claim 1, wherein the number N of positions for the calibration marker is at least six.

14. A method of using a robot controller including:
   positioning the calibration marker, with the robot controller, in a plurality of positions along an optical line of a camera unit;
   imaging the calibration marker, with the camera unit, at the plurality of positions along the optical line to establish line positions P$_1$ . . . P$_N$ of the calibration marker along the optical line within a tolerance k, while monitoring joint values j$_1$ . . . j$_M$ of the robot;
   establishing an error function based on resulting calculated robot positions P'$_1$ . . . P'$_N$ for the calibration marker for joint values j$_1$ . . . j$_M$ at each line position P$_1$ . . . P$_N$ for the calibration marker;
   identifying a set of robot kinematic parameters by solving an optimization problem based on the error function; and
   updating a kinematic model of the robot using the identified set of robot kinematic parameters.

15. A robot system comprising
a robot with a movable part with a calibration marker;
a robot controller with a kinematic model of the robot, wherein the robot controller is arranged to control the movable part in a three-dimensional space based on control input;
a camera unit that is arranged to capture images of the calibration marker on the movable part;
wherein that the robot system is arranged to
position the calibration marker, with the robot controller, in a plurality of positions along an optical line of the camera unit;
image the calibration marker, with the camera unit, at the plurality of positions along the optical line to establish line positions $P_1 \ldots P_N$ of the calibration marker along the optical line within a tolerance, while monitoring joint values $j_1 \ldots j_M$ of the robot;
establish an error function based on resulting calculated robot positions $P'_1 \ldots P'_N$ for the calibration marker for joint values $j_1 \ldots j_M$ at each line position $P_1 \ldots P_N$ for the calibration marker;
identify a set of robot kinematic parameters by solving an optimization problem based on the error function; and
update the kinematic model of the robot using the identified set of robot kinematic parameters.

* * * * *